United States Patent [19]

Strange et al.

[11] 4,061,437

[45] Dec. 6, 1977

[54] PILOT HOLE BORER

[75] Inventors: Delbert D. Strange; Ronald M. Hunts, both of San Diego, Calif.

[73] Assignee: Manufacturing Approaches & Total Concepts, Inc., San Diego, Calif.

[21] Appl. No.: 723,973

[22] Filed: Sept. 16, 1976

[51] Int. Cl.² ............................................. B23B 39/16
[52] U.S. Cl. ...................................... 408/42; 144/92; 144/325; 408/48; 408/53; 408/127; 408/241 G
[58] Field of Search ...................... 144/92, 93 R, 93 A, 144/325; 408/42, 48, 53, 127, 128, 241 G; 83/467; 269/321 A

[56] References Cited

U.S. PATENT DOCUMENTS

| | | | |
|---|---|---|---|
| 1,660,372 | 2/1928 | Bockhoff | 408/42 |
| 2,670,545 | 3/1954 | Kaminski | 144/92 X |
| 3,230,797 | 1/1966 | Murschel | 144/92 X |
| 3,260,137 | 7/1966 | Obmann | 408/42 X |
| 3,797,363 | 3/1974 | Nohejl | 408/42 X |
| 3,884,280 | 5/1975 | Chailer | 408/22 X |

*Primary Examiner*—Harrison L. Hinson
*Assistant Examiner*—W. D. Bray
*Attorney, Agent, or Firm*—Cahill, Sutton & Thomas

[57] ABSTRACT

A manually operable boring apparatus powered by compressed air drills precisely located pilot holes in cabinet doors to assist in the installation of apertured cabinet hinges. Upon the command of an operator, the hole boring apparatus causes a drill assembly containing three rapidly rotating drill bits to extend one-quarter inch into the rear face of a cabinet door. The boring apparatus further includes a bracket and retractable indexing pins which locate the drill bits a predetermined distance from the end of the cabinet door.

12 Claims, 5 Drawing Figures

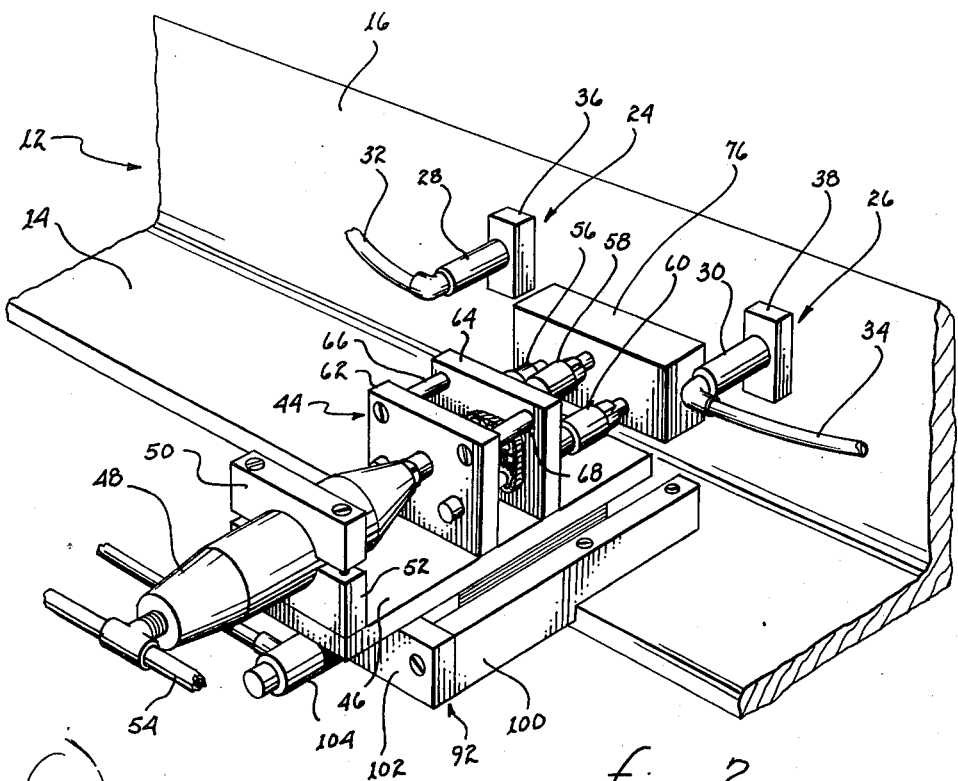
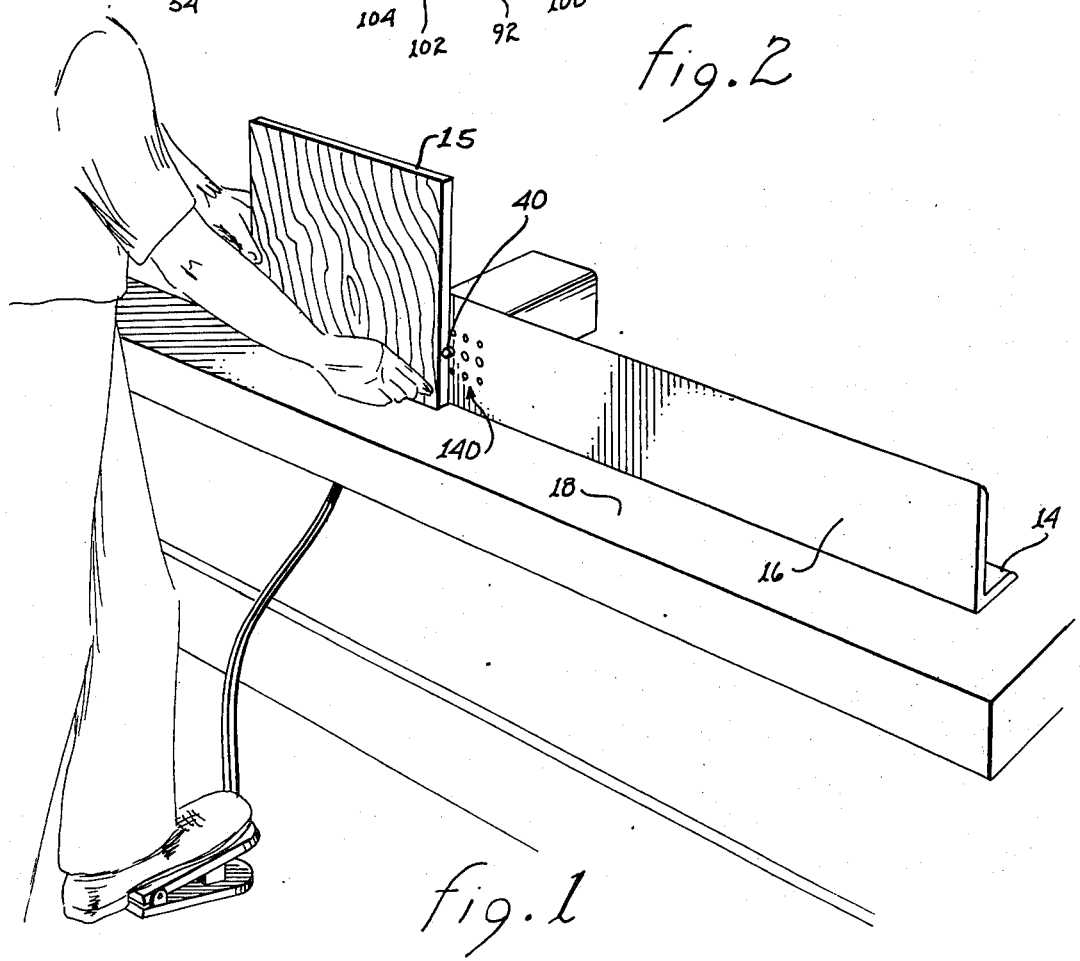

PILOT HOLE BORER

BACKGROUND OF THE INVENTION

1. Field of the Invention

The present invention relates to an apparatus for drilling holes in a material and, more particularly, to an apparatus for drilling precisely positioned hinge screw pilot holes in cabinet doors.

2. Description of the Prior Art

Because cabinet doors are constructed of relatively hard wood, it is necessary to drill pilot holes for the hinge screws. These pilot holes serve two purposes: they assure proper positioning of the screws on the cabinet door and they facilitate engaging the screws in the face of the door. The screw pilot holes must be properly positioned with respect to each other and offset a precise distance from the edge of the cabinet door. If the pilot holes are not exactly located, the cabinet door will be misaligned with respect to the frame upon which it is mounted.

The classic method of making pilot holes in a cabinet door is quite primitive. A cabinet maker places a hinge on the back of a cabinet door and visually aligns it. He then marks the approximate center of each hinge aperture, removes the hinge, and, with a hand-held drill, drills pilot holes into the wood. Due to the inherent inaccuracies of this method, the cabinet maker cannot merely insert the hinged screws and tighten them down. On the contrary, the cabinet maker must make numerous small adjustments as he tightens the hinge screws to insure that the cabinet door is in proper alignment with the cabinet frame.

A second prior art solution to the problems encountered in mounting hinges on cabinet doors is an automatic hinging machine. This very sophisticated device automatically positions both the upper and lower hinges on a cabinet door, drills both groups of pilot holes, and simultaneously inserts and tightens all hinge screws. This device is very complex and quite expensive.

A primary drawback of this device, other than its very high cost of acquisition, is that time consuming disassembly and modification is required to adapt it for use with cabinet doors of differing lengths. If, for instance, the automatic hinging machine has been mounting hinges on a relatively short cabinet door, its mounting machinery must be located relatively close together. If the user of this machine then desires to mount hinges on larger cabinet doors, the automatic hinging machine must be substantially dismantled so that the drilling and screwing mechanisms can be repositioned at a location further apart from each other. This is a very time consuming process which users normally avoid by scheduling only very long production runs for each size cabinet door.

The primary disadvantage of manually mounting hinges on cabinet doors is that it requires a highly skilled cabinet maker and is a time consuming procedure. The primary disadvantage of the automatic hinging machine is that it is very costly and cannot be quickly adapted to handle cabinet doors of varying sizes.

SUMMARY OF THE INVENTION

It is therefore a primary object of the present invention to provide a pilot hole borer which makes the task of installing hinges on cabinet doors so simple and error free that unskilled workers can perform this task.

Another object of the present invention is to provide a pilot hole borer which allows unskilled workers to drill precisely located groups of pilot holes in a cabinet door.

Yet another object of the present invention is to provide a pilot hole borer which requires no readjustment to drill properly located pilot holes in cabinet doors of varying sizes.

Still another object of the present invention is to provide a pilot hole borer which drills pilot holes of consistent depth and shape in a cabinet door.

A further object of the present invention is to provide a pilot hole borer which is inexpensive to acquire and requires little maintenance.

Yet a further object of the present invention is to provide a pilot hole borer which is powered by compressed air and actuatable by depressing a foot pedal.

A still further object of the present invention is to provide a pilot hole borer which, once actuated, automatically commences and terminates the hole boring sequence.

These and other objects of the present invention will become apparent to those skilled in the art as the description thereof proceeds.

BRIEF DESCRIPTION OF THE DRAWINGS

The present invention will be described with specificity and clarity with reference to the following drawings, in which:

FIG. 1 is a perspective view of the pilot hole borer embodying the present invention;

FIG. 2 is a perspective view of the pilot hole borer shown in FIG. 1 taken from the rear with its dust cover removed;

DESCRIPTION OF THE PREFERRED EMBODIMENT

Figure 3:
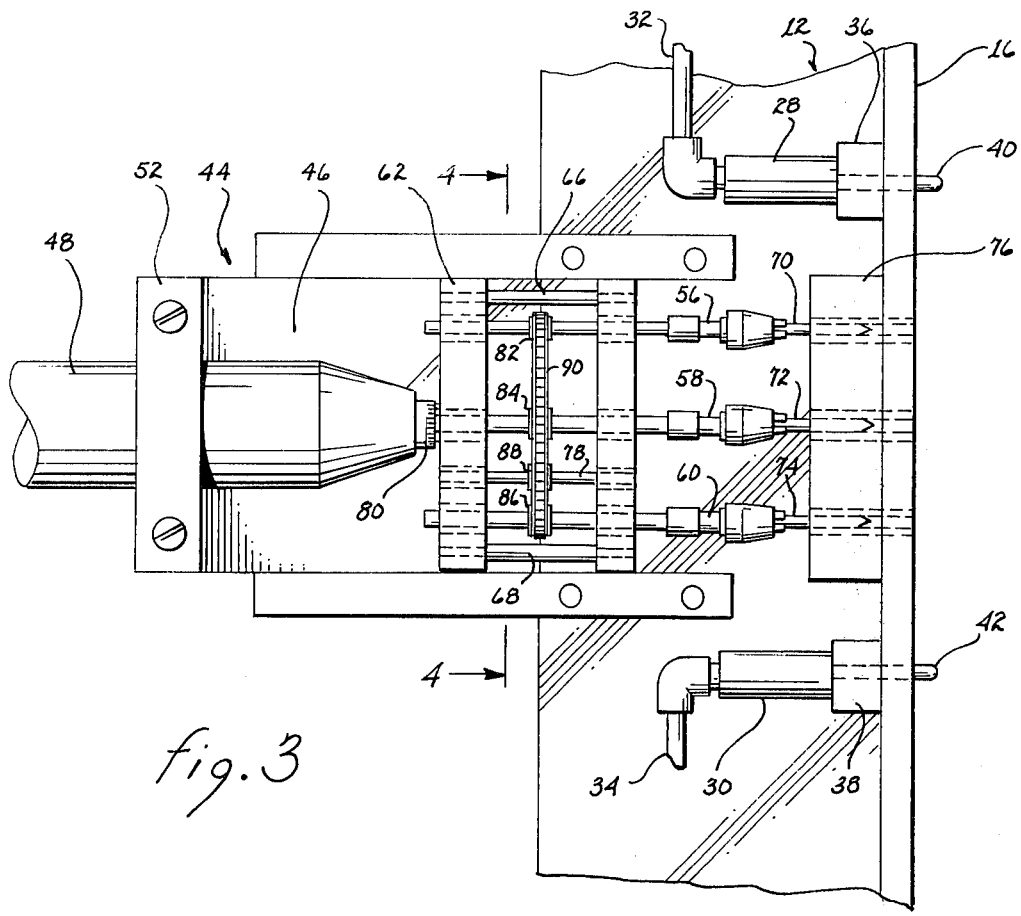
FIG. 3 is a plan view of the pilot hole borer shown in FIG. 2.

A pilot hole borer 10 constructed in accordance with the teachings of the present invention is illustrated in FIG. 1. Bracket means 12 includes base 14 and vertical fence 16. Base 14 is rigidly mounted to the upper surface 18 of a bench or table by a plurality of screws. The operator places the rear surface of cabinet door 15 vertically against the face of fence 16 and slides the cabinet door to the right until the right edge of the door abuts indexing pin 40 which protrudes from the face of the fence. The operator then depresses foot pedal 22 which causes three rapidly rotating drill bits to extend approximately one-quarter inch out of the face of vertical fence 16 into the rear surface of cabinet door 15. This first step bores three pilot holes in the right side of cabinet door 15.

To drill the second set of pilot holes in the left side of door 15, the operator removes door 15 from the face of vertical fence 16, slides it to the right and places its rear surface flush against the face of vertical fence 16. He then slides door 15 to the left until its left edge abuts a second retractable indexing pin. At this point the operator again actuates foot pedal 22 and the borer produces a second set of pilot holes in the left side of cabinet door 15.

These two groups of pilot holes are precisely aligned with the edges and ends of door 15 and are of uniform shape and depth. An unskilled worker can now mount hinges upon door 15 by screwing hinge screws into the pilot holes formed by the hold borer 10. No further adjustments of visual alignment procedures are required.

A more detailed description of the preferred embodiment will now be set forth by referring to FIGS. 2 and 3. Bracket means 12 includes two indexing pin assemblies 24 and 26. Indexing pin assemblies 24 and 26 are supplied with air having a pressure on the order of 10-20 psi by air lines 32 and 34. Indexing pin assemblies 24 and 26 include air cylinders 28 and 30 which are mounted on mounting blocks 36 and 38 and contain retractable indexing pins 40 and 42 that protrude approximately one-quarter of an inch out of the face of fence 16. Indexing pins 40 and 42 are maintained in an extended position by the low pressure air which is coupled to air cylinders 28 and 30. These indexing pins are easily retracted so that one of them at a time can be depressed into the face of fence 16 when cabinet door 15 is positioned against the face of fence 16.

Drill assembly 44 includes a base plate 46. Air motor 48 is secured to base plate 46 by upper and lower yoke assemblies 50 and 52. Chuck 80 of air motor 48 is rotated at 4500 RPM in response to high pressure air from high pressure air line 54. Pin vices 56, 58, and 60 are rotatably mounted in bearing blocks 62 and 64. A rotatable idler shaft 78 also extends between support blocks 62 and 64. Drill bits 70, 72, and 74 are securely mounted in pin vices 56, 58, and 60 and extend through passageways in drill block 76 and fence 16. Spacers 66 and 68 maintain the upper portions of bearing blocks 62 and 64 at a fixed distance from each other.

Figure 4:
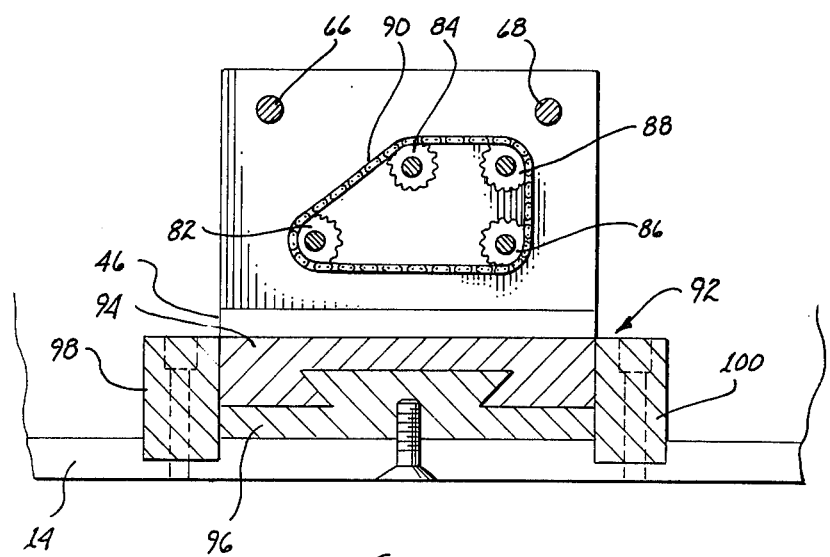
FIG. 4 is a sectional view of the pilot hole borer shown in FIG. 3, taken along lines 4—4.

The transmission assembly 79 is best described by referring to FIGS. 3 and 4. Drill chuck 80 is connected to the end of pin vice 58 which protrudes out of support block 62. In this manner the rotary motion of drill chuck 80 is imparted to pin vice 58. Sprockets 82, 84, 86, and 88 are coupled respectively to the shafts of pin vices 56, 58, and 60 and to the shaft of idler 78. Chain 90 passes around the outer edges of sprockets 82, 84, 86, and 88 and serves to impart the rotary motion of pin vice 58 to pin vices 56 and 60. In this manner, drill bits 70, 72, and 74 are driven in the same direction and at the same rate by air motor 48.

The drill assembly guide means 92 is best illustrated by referring to FIGS. 2 and 4. The lower edge of base plate 46 is mounted to upper dovetail slide assembly 94 which slides over lower dovetail slide assembly 96. Side bracket members 98 and 100 are located on the left and right sides of dovetail slide assemblies 94 and 96. Cross bar 102 is mounted across the rear edges of side brackets 98 and 100.

A displacing means or double actuated air cylinder 104 is attached to cross member 102. Its shaft (not shown) protrudes through a passageway in cross member 102 and is attached to the rear of upper dovetail slide assembly 94. The in and out motion of shaft 118 of double actuated air cylinder 104 is transmitted to drill assembly 44 as a reciprocating motion to reposition drill bit 70, 72, and 74 between a flush position and an extended position with respect to fence 16.

Figure 5:
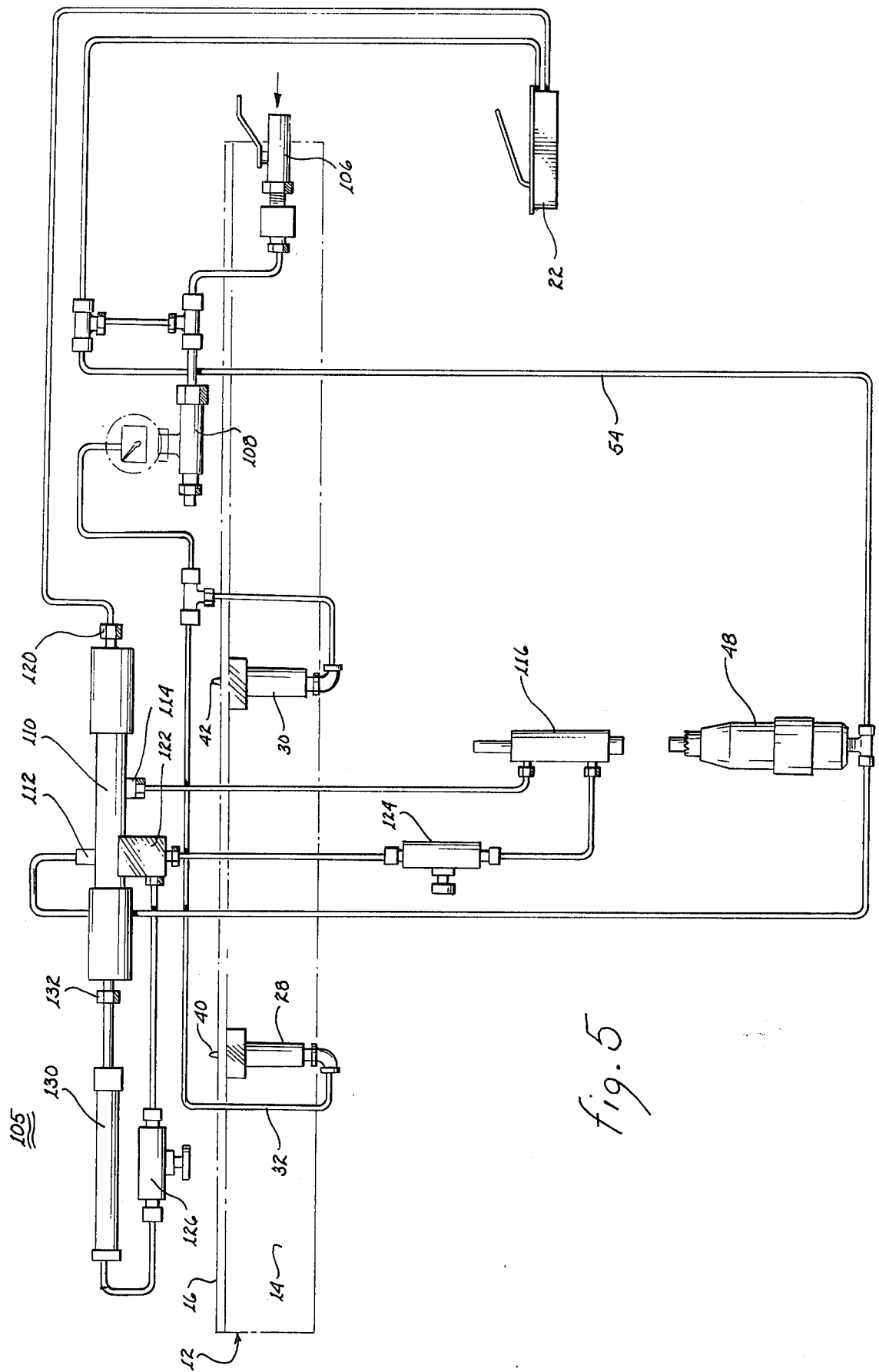
FIG. 5 is a schematic representation of the control means of the pilot hole borer.

FIG. 5 illustrates the control means 105 which coordinates and controls the various functions of pilot hole borer 10. A source of high pressure air on the order of 120 psi is connected to on/off valve 106. When valve 106 is turned on by the operator, hgih pressure air is transmitted to air pressure regulator 108, foot pedal 22, air motor 48 and to inlet port 112 of switching means 110. By inspection, it is apparent that air motor 48 operates continuously when valve 106 is in the "on" position.

Air pressure regulator 108 receives the high pressure air from valve 106 and delivers air pressure in the range of 10-20 psi to output lines 32 and 34 and actuates retractable indexing pins 40 and 42. This reduction in air pressure is provided so that indexing pins 40 and 42 can be easily depressed by cabinet door 15.

Switching means 110 is designed to have the high pressure air present at inlet port 112 normally coupled to output port 114 and thence to port 116 of air cylinder 104. The high pressure air at port 116 maintains the shaft 118 of air cylinder 104 in a retracted position. Since shaft 118 of air cylinder 104 is coupled to drill assembly 44, the drill assembly 44 is also maintained in a retracted position and drill bits 70, 72, and 74 remain within fence 16.

When foot pedal 22 is depressed, high pressure air is coupled to control port 120 of switching means 110. The presence of high pressure air at control port 120 switches the flow of high pressure air arriving at inlet port 112 from outlet port 114 to outlet port 122. The high pressure air flowing out of outlet port 122 is coupled to flow control valves 124 and 126. These flow control valves limit the rate of air pressure buildup from ambient pressure to 120 psi. The smoothly increasing air pressure output from flow control valve 124 is connected to inlet port 128 of air cylinder 104. The air pressure inside air cylinder 104 smoothly but rapidly increases to a value of 120 psi and extends shaft 118 approximately 1 inch. This displacement of shaft 118 is transmitted to drill bits 70, 72, and 74 by drill assembly 44, causing the three drill bits to extend ¼ inch out of fence 16 and thus creating three ¼ inch deep pilot holes in the face of cabinet door 15.

The output of flow control valve 126 is coupled to air accumulator 130. The output of accumulator 130 is coupled to control port 132 of switching means 110. Accumulator 130 is inserted to prevent the pressure existing at control port 132 from actuating the switching means 110 until shaft 118 has had approximately 1.5 seconds to become fully extended. When the air pressure at control port 132 reaches a threshold value, switching means 110 is actuated and the high pressure air at inlet port 112 is switched back to outlet port 114. Since outlet port 114 is coupled directly to inlet port 116 of air cylinder 104, shaft 118 is immediately retracted and drill bits 70, 72, and 74 are thereby retracted into fence 16.

Since it requires only one a a half seconds to drill each set of pilot holes and since it takes perhaps five seconds to rotate cabinet door 15 and align it upon fence 16, both sets of pilot holes can be drilled in a cabinet door in approximately 10 seconds.

Since hinges are almost universally mounted a fixed distance from the top and bottom of cabinet doors of various lengths, this pilot hole borer can be used without modification of any sort to drill pilot holes in cabinet doors of varying lengths. Short cabinet doors and long cabinet doors can be readily intermixed during production runs with absolutely no change required in the hole borer set up.

Not all purchasers of a pilot hole borer desire to have hinges mounted at the same distance from the top and bottom of a cabinet door. As can be seen from FIG. 1, a plurality of mounting holes 140 are provided in the face of fence 16 to allow the mounting of indexing pin assemblies 24 and 26 at various distances from drill bits 70, 72, and 74. Moving indexing pin assemblies 24 and 26 further away from the drill bits allows the mounting of hinges further away from the upper and lower surfaces of a cabinet door. This adjustment is normally made once at the factory for a particular customer and is typically not changed in the field.

In the preferred embodiment of the invention, compressed air has been used to power the apparatus. Other power sources such as hydraulic pressure or electricity could also be used. In the electrically powered embodiment, an electric motor could be substituted for air motor 48 and an electrically operated solenoid assembly could replace air cylinder 104. Additionally, the retractable indexing pins 40 and 42 could be biased outward by springs rather than the low pressure air as has been disclosed.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. Apparatus for drilling guide holes in a base member, which guide holes receive securing means for attaching a precisely located fitting on the base member, said apparatus comprising in combination:
   a. drill means for drilling a plurality of holes disposed in spaced relationship on the base member, said drill means being displaceable from a retracted position to an extended position, said drill means including:
      i. a plurality of pin vices;
      ii. a drill bit secured within each of said plurality of pin vices;
      iii. a drill motor for rotating said plurality of pin vices;
      iv. a transmission assembly for interconnecting said drill motor with said plurality of pin vices; and
      v. support means for rigidly supporting said plurality of pin vices and said drill motor;
   b. bracket means for supporting said drill means, said bracket means having an upstanding face and including indexing means thereon for locating the base member along the face of said bracket means, said indexing means comprising:
      i. a retractable pin for indexing the base member; and
      ii. means for biasing said retractable pin out of the face of said bracket means;
   c. guide means secured to said bracket means for directing said drill bits in a straight line during displacement of said drill means from the retracted to the extended position;
   d. displacing means secured to said bracket means for displacing said drill means from the retracted position to the extended position and return to bring said drill bits into and out of engagement with the base member; said displacing means including a double actuated cylinder having a translatable shaft secured to said guide means for repositioning said drill means from the retracted position to the extended position; and
   e. control means for regulating the operation of said displacing means at a predetermined rate, said control means including foot operated means for selectively actuating said regulating means;

whereby, said drill means drills a plurality of precisely located holes at a predetermined location on the base member.

2. Apparatus for drilling guide holes in a base member, which guide holes receive securing means for attaching a precisely located fitting on the base member, said apparatus comprising in combination:
   a. drill means for drilling a plurality of holes in spaced relation in the base member;
   b. bracket means for supporting said drill means, said bracket means having an upstanding face thereon face and including indexing means for locating the base member along the face of said bracket means in relation to said drill means;
   c. displacing means for extending said drill means through said bracket means into engagement with the base member and retracting said drill means out of engagement with the base member; and
   d. controls means for selectively actuating said displacing means to drill the holes in the base member;

whereby, said drill means drills a plurality of holes precisely located in the base member.

3. The apparatus as set forth in claim 2 wherein said drill means comprises:
   a. a plurality of pin vices for supporting drill bits;
   b. a drill motor for providing rotational motion to said pin vices;
   c. a transmission assembly for transferring power from said drill motor to said plurality of pin vices; and
   d. support means for rigidly supporting said plurality of pin vices and said drill motor.

4. The apparatus as set forth in claim 3 including guide means for directing the drill bits in a straight line during displacement of said drill means from the retracted to the extended position.

5. The apparatus as set forth in claim 4 wherein said guide means comprises:
   a. an upper dovetail slide assembly secured to said support means; and
   b. a lower dovetail slide assembly mounted on said bracket means.

6. The apparatus as set forth in claim 5 wherein said transmission assembly comprises:
   a. a sprocket attached to the shaft of each of said pin vices;
   b. a continuous chain interconnecting said sprockets with one another;

whereby, the rotational motion of said drill motor is transferred to each of said plurality of pin vices.

7. The apparatus as set forth in claim 6 wherein said control means comprises:
   a. means for energizing said displacing means to reposition said drill means from the retracted position to the extended position at a predetermined rate; and
   b. foot operated means for selectively actuating said energizing means.

8. The apparatus as set forth in claim 7 wherein said bracket means comprises indexing means extending out of the face of said bracket means for locating the base member along the face of said bracket means.

9. The apparatus as set forth in claim 8 wherein said indexing means comprises:
  a. a retractable indexing pin; and
  b. means for biasing said retractable indexing pin out of the face of said bracket means.

10. The apparatus as set forth in claim 9 wherein said displacing means comprises a double actuated cylinder having a translatable shaft secured to said upper dovetail slide assembly for repositioning said drill means from the retracted position to the extended position.

11. The apparatus as set forth in claim 10 wherein said drill motor comprises an air motor.

12. The apparatus as set forth in claim 2 including a source of air under pressure for powering said drill means.

* * * * *